United States Patent

Schulte

[11] Patent Number: 4,764,137
[45] Date of Patent: Aug. 16, 1988

[54] FLOATABLE DREDGE HOSE

[76] Inventor: Frank Schulte, Box 26, Mayo, Fla. 32066

[21] Appl. No.: 929,824

[22] Filed: Nov. 13, 1986

[51] Int. Cl.⁴ .................... B63B 21/52; F16L 55/00
[52] U.S. Cl. .................................. 441/133; 138/104; 37/72
[58] Field of Search ................... 441/133; 405/171; 138/103, 110, 118, 121, 132, 172, 174; 37/72; 141/279, 387, 1, 389; 174/101.5

[56] References Cited

U.S. PATENT DOCUMENTS

| | | | |
|---|---|---|---|
| 13,223 | 3/1911 | Daniell | 138/103 |
| 2,181,086 | 11/1939 | Bohrer | 138/110 |
| 3,074,083 | 1/1963 | Schirmer | 37/72 |
| 3,489,182 | 1/1970 | Cameron | 441/133 |
| 3,594,835 | 7/1971 | Wilson | 441/133 |
| 3,921,238 | 11/1975 | Johnson | 441/133 |
| 3,992,735 | 11/1976 | McCarthy | 441/133 |
| 4,153,079 | 5/1979 | Ambrose | 138/103 |
| 4,188,679 | 2/1980 | Hollaender et al. | 441/133 |
| 4,320,590 | 3/1982 | Holekamp | 37/72 |

Primary Examiner—Sherman D. Basinger
Assistant Examiner—Edwin L. Swinehart
Attorney, Agent, or Firm—Dowell & Dowell

[57] ABSTRACT

A floatable heavy duty hose assembly for conveying fluid entrained materials during dredging and related operations which includes a flexible cylindrical conduit which is reinforced at spaced intervals and wherein a plurality of floats are mounted in surrounding relationship with the conduit at the areas of reinforcement to thereby provide evenly distributed areas of flotation intermediate spaced areas of flexibility with the overall structure permitting the hose assembly to be handled and maneuvered in a uniform manner without undue interference by the floats.

16 Claims, 2 Drawing Sheets

FLOATABLE DREDGE HOSE

BACKGROUND OF THE INVENTION

1. Field of the Invention

This invention relates generally to floatable pipes, hoses and tubular conduits and especially to generally heavy duty flexible floatable hoses of the type which may be used in dredging operations and which include a plurality of spaced flotation members mounted along the length thereof. The flexible hoses are reinforced at spaced locations prior to the placement of the flotation members at such spaced locations to thereby insure proper float positioning. The floatable hose structures are designed to reduce crimping or collapsing of flexible conduits during use and yet be pliable enough to facilitate deployment during normal operation by providing alternate flexible and rigid hose sections.

2. History of the Art

Heretofore there have been a variety of developments toward providing flotation devices for dredge hoses or pipes and the like. In U.S. Pat. No. 4,320,590 to Holekamp, flotation elements are disclosed for supporting dredge pipes or conduits wherein the elements are formed from tire carcasses which are spread open at the beaded edges around the openings and the inside of the tires filled with a foamed plastic material. The flotation elements are then placed around a pipe or conduit and are attached to a support line. With this structure, the flotation elements are free to move relative to the hose or conduit, and therefore, a unified support is not possible at all times unless the flotation elements are placed in side-by-side abutting relationship with one another. Also, as the flotation elements can shift, it would be extremely difficult to maintain an evenly supported conduit which would exhibit the same degree of flexibility along its length. That is, at some locations the flotation elements would bind together thereby restricting bending or curving of the conduit while at other locations, the conduit may be unsupported for substantial distances thereby creating conditions wherein the conduit may be crimped or bent to such a degree as to obstruct proper flow through the conduit.

Another prior art example of attachable floats for dredge pipes is disclosed in U.S. Pat. No. 3,992,735 to McCarthy. In this patent, inflatable C-shaped open rings are utilized as floats. In order to provide a tightly fitted engagement of the floats with the dredge pipe, the rings are designed to constrict the side walls of the pipe when inflated. Such flotation devices are subject to failure by being punctured and are also capable of being shifted relative to other floats placed on the pipe.

Other prior pipe flotation devices include closeable ring structures which may be brought into an annular engagement with pipes or other fluid conduits being supported. Such structures also do not permit a relatively fixed relationship to be established between the floats and the pipes without bonding with glues or adhesives. Such bonds are also subject to failure permitting movement of the floats. Examples of closeable ring floats include U.S. Pat. Nos. 3,489,182 to Cameron and 4,188,679 to Hollaender et al.

Examples of other prior art pipes or fluid conduit floats are disclosed in U.S. Pat. Nos. 3,074,083 to Schirmer, 3,594,835 to Wilson and 3,921,238 to Johnson.

SUMMARY OF THE INVENTION

This invention is directed to a floatable heavy duty hose of the type used in dredging and other equipment operations wherein the hose is deployed in an aqueous environment. The hose includes a generally pliable cylindrical material conveying conduit which is reinforced at spaced intervals along the length thereof. The reinforcing is preferably embedded within the walls of the conduit and may include a coiled reinforcing metal wire. The reinforced sections of conduit provide relatively rigid areas of support for a plurality of floats which are formed or secured in surrounding relationship with the conduit at each reinforced section thereof. The floats are preferably constructed having a water impervious cylindrical outer shell which defines a cavity in which a foam material is retained. The floats are coextensive with or greater in length than the reinforced sections of conduit. In some embodiments, the ends of the floats extend outwardly beyond the reinforced areas so that a portion of flexible or pliable conduit extends through such ends. The spacing between the floats is also preferably uniform and the distance between floats is optimally equal to substantially the length of the floats.

It is the primary object of the present invention to provide a floatable hose which is sturdy enough to be used with conventional dredging machines but which offers a greater degree of deployment flexibility than is possible using conventional dredge pipe or hose floats.

It is another object of the present invention to provide a heavy duty flotable hose which may be deployed in a relation compact serpentined, circular or other compact configuration adjacent a floating barge, dredge or other vessel and in which the floats permit the hose to be easily played out relative to the vessel as the vessel moves during operation.

It is also an object of the present invention to provide a flotable hose wherein the floats are mounted at regularly spaced intervals along a generally flexible conduit and wherein the conduit is initially reinforced at the areas at which the floats are to be mounted to prevent the walls from collapsing and also to prevent any undesireable shifting of the floats relative to the conduit.

Another object of the present invention is to provide a flotable heavy duty hose for use with dredging and other related equipment wherein the hose includes alternating sections of flexible and rigid conduit so that the overall structure is easily maneuverable into arcuate configurations and yet strengthened to prevent any collapsing, kinking or closing off of the flexible sections due to stresses placed along the length of hose or due to pressure surges within the hose.

DESCRIPTION OF THE PREFERRED EMBODIMENT

Figure 1:
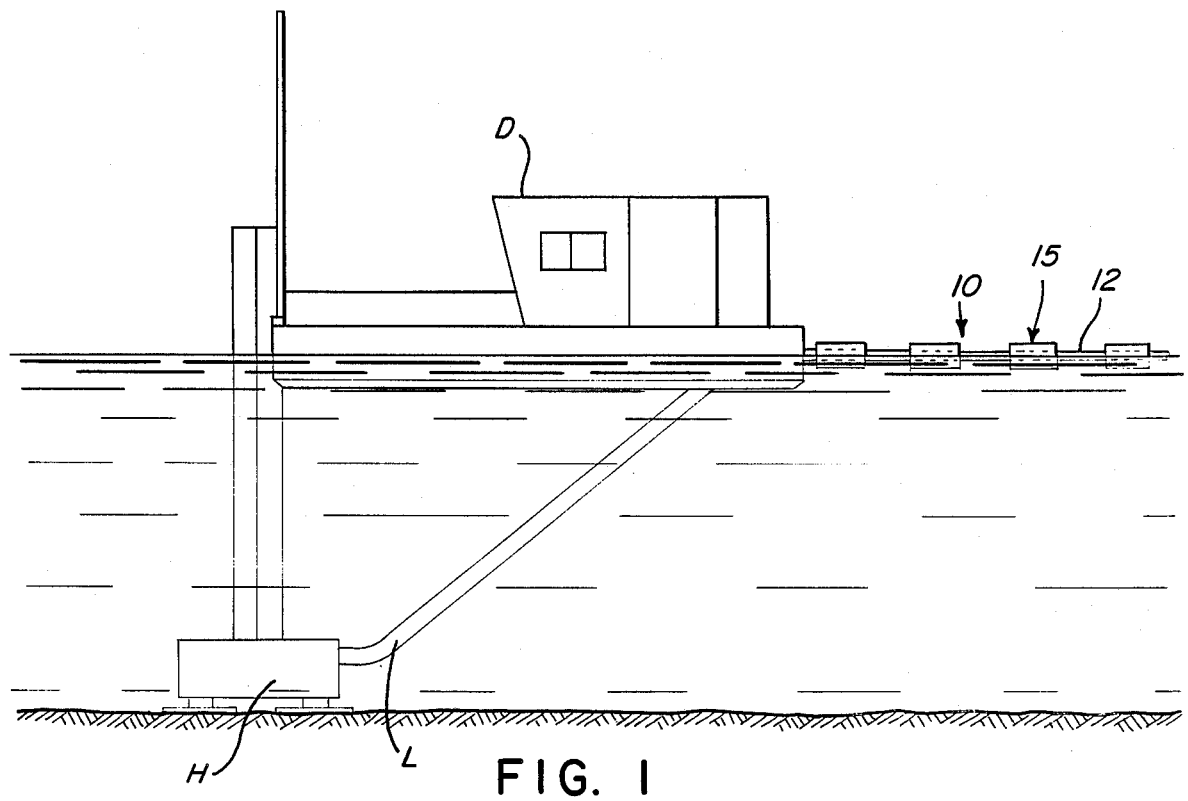
FIG. 1 is an illustrational view of the invention as utilized with a conventional water borne dredging machine.
Figure 2:
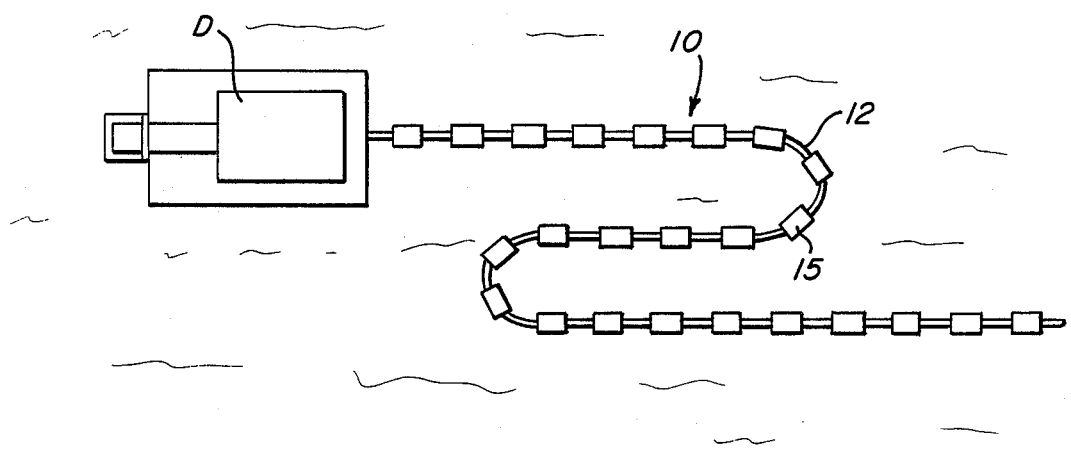
FIG. 2 is a reduced top plan illustrational view of the invention as shown in claim 1 showing an example of a serpentined hose deployment.

With continued reference to the drawings, the flotable hose assembly 10 of the present invention is shown in FIGS. 1 and 2 as being used as a dredging hose which extends from a dredging unit D to a remote location on shore or to an adjacent vessel. It should be noted that the flotable hose assembly is a relatively pliable heavy duty type of hose which may be used in various fluid conveying applications and environments and therefore is not limited to use in dredging operations although being particularly adapted thereto.

In the environment disclosed in the drawings, the hose assembly 10 is shown as being floated in a serpentine configuration adjacent the dredging unit. The configuration permits the hose assembly to be played out or extended without creating crimps in the fluid conduit as the dredging unit is continuously moved relative to the material discharge location. The dredging unit is utilized to draw or lift silt, mudd, rocks, earth and debris from the floor of a body of water. The debris is lifted through suction heads H through a fixed material discharge line L and subsequently pumped through the flotable hose assembly 10 to a remote discharge location. Due to the size of material encountered in dredging operations, the diameter of the flotable hose assembly may vary with conventional dredging hoses or pipes being of 6 to 12 inches or more in diameter.

The floatable hose assembly 10 includes a generally pliable fluent material conveying conduit 12 which may be of various conventional structures. As shown, the conduit is made of an extruded synthetic or natural rubber material. Again, other materials may be used to manufacture the conduit and various extruding and/or wrapping techniques may be used. It is only necessary that the primary conduit structure be rated or acceptable for a particular use, such as dredging, and have generally pliable or flexible side walls 13 which are formed into an elongated cylindrical configuration having a generally constant inner diameter.

The material conveying conduit 12 of the present invention is modified in its otherwise conventional structure by providing reinforcing 14 at predetermined spaced locations along the length thereof. The reinforcing may take a variety of forms or accomplished using a variety of materials. The reinforcing 14 is shown as being formed of a spiraled or coiled metallic wire which is generally tightly wound into closely spaced loops which extend along a predetermined length of the conduit 12. The coiled wire is preferrably placed within the side walls 13 during the extrusion or other formation process. The diameter of the wire may vary depending upon needs, however, the reinforcing should resist any collapsing of the contiguous side wall areas of the conduit especially during the attachment of the floats 15. Also, although the reinforcing wires are shown as being positioned within the walls of the fluid conduit, it is envisioned that in some circumstances, the reinforcing may be placed on the surface of the conduit.

The floats 15 are shown as having a generally cylindrical housing 16 and end walls 17 and 18. The housings are formed of a fluid impervious material such as a polyethylene plastic and have an outer dimater somewhat greater than the outer diameter of the fluent material conveying conduit. In this manner, the float housings form generally enclosed annular cavities 19 which surround the conduit when the floats are formed or mounted thereto.

In order to make the floats as light weight as possible and yet provide a relatively inexpensive and efficient media for insuring a non-slipping or non-shifting contact or engagement between the floats and the conduit, it is preferred to fill the cavities 19 with a plastic foam material 20 such as styrafoam. The foam substantially fills the cavities of the floats so as to provide even ballast. The central portion of the floats which abut the conduit define passageways 22 having a substantially constant outer diamater which is generally equal to the outer diameter of the conduit 12. In essence, in the preferred method of introducing the foam into the cavities formed by the float housings after the housings are placed around the conduit 12, the foam materials will bind against the conduit in the areas of the reinforcing. Further, as the conduit is reinforced to retain its circular cross section at those places or locations where the floats are to be secured or mounted, the contact between the walls of the conduit and the foam should be continuous. The floats are thus secured in fixed relationship to the conduit so that the floats cannot be shifted axially of the conduit during use. Again, although the float structure discussed above is preferred, other float structures could be used in combination with the reinforced conduit sections to create other embodiments of the floatable hose assembly of the present invention.

To facilitate the original positioning or mounting of the floats with respect to the conduit, aligned openings 24 and 25 are provided through each of the end walls 17 and 18, respectively, of the housings. The aligned openings are of a diameter which is generally equal to or just slightly greater than the diameter of the conduit 12.

Figure 3:
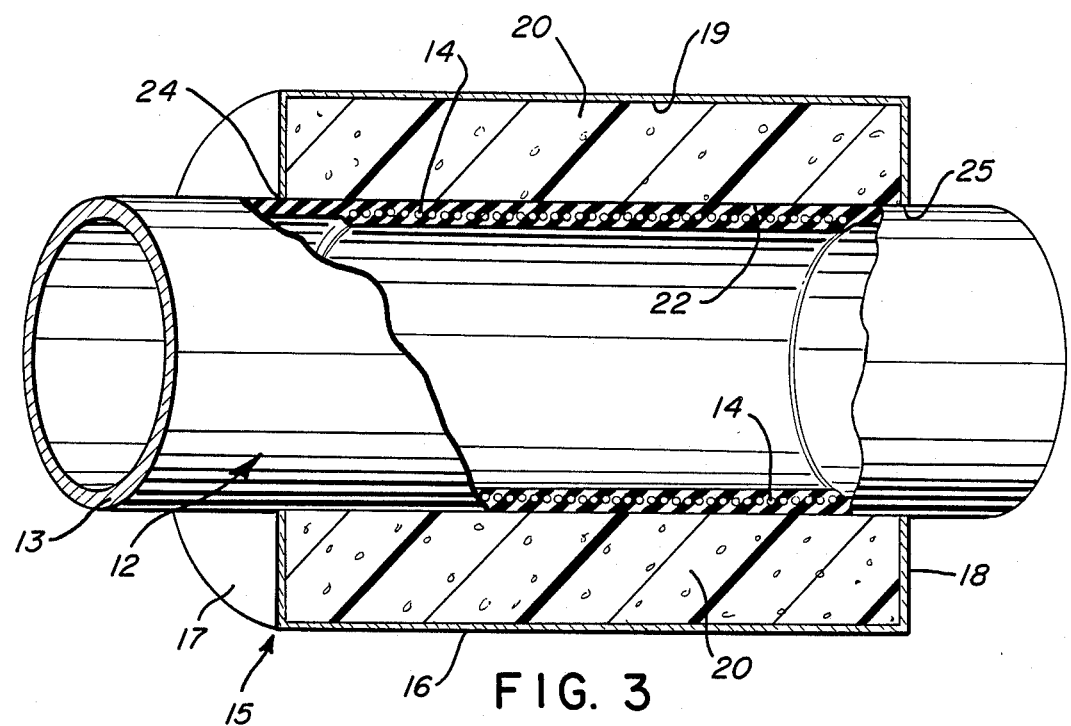
FIG. 3 is a partial cross sectional view taken along a longitudinal portion of the conduit and a float of the present invention.
Figure 4:
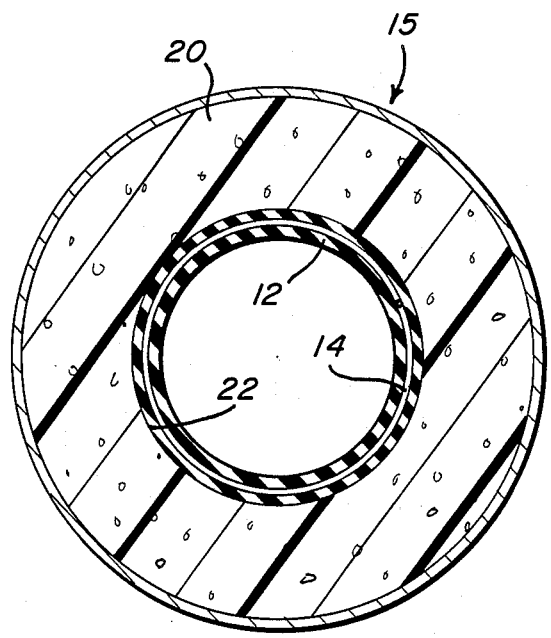
FIG. 4 is a cross sectional view taken perpendicularly with respect to the conduit and through a float of the present invention.

With particular reference to FIG. 3 of the drawings, in the preferred form of the invention, the floats 15 should be of a length which is greater than the predetermined length of the underlying reinforcing or coiled wire 14. Further, the ends 17 and 18 of the floats should extend outwardly beyond the reinforcing wire by approximately the same distance. In this manner, the conduit 12 will exhibit some degree of flexibility in the areas of the openings 24 and 25 in the ends of the floats. This flexibility will permit a relative amount of bending adjacent the floats without causing damage to the outer shell of the floats or the end portions thereof. Also, such a structure permits the overall hose assembly to exhibit a greater degree of controlled deformation in deployment, that is, the hose assembly can be more compactly coiled or arranged. It has generally been determined that the floats not exceed a length which is 25% greater than the predetermined length of the underlying reinforced area of conduit.

In forming the overall hose assembly 10, the reinforced sections and the floats should be spaced so as to insure adequate flotation or support and thereby prevent undue sagging or bending of the material conveying conduit while simultaneously permitting the hose assembly to exhibit sufficient flexibility to allow the assembly to be deployed in relatively compact circular or serpentined configurations. If insufficient support is provided, the material conveying conduit could become crimped or bent to a degree which would obstruct the flow of materials therethrough. Although the distance between floats may vary depending upon the anticipated end use or the structure and size of conduit used in manufacture, it has been determined that a preferred spacing for dredging operations is generally not greater than the length of the floats. Therefore, if the floats are to be thirty (30) inches in length, the spacing between each float would be generally not greater than thirty (30) inches. Further, to insure uniformity in performance and handling of the hose assemblies of the present invention, the reinforced areas should be generally equally spaced relative to one another. In a like manner, the floats should be generally equally spaced relative to one another.

By way of example, a flotable dredge hose has been constructed utilizing an extruded rubber conduit having spaced sections of reinforcing wire formed therein during the extrusion process. The reinforcing wire was installed in approximately twenty-four (24) inch lengths. The conduit had an outside diameter of approximately eight (8) inches with each float having a length of approximately thirty (30) inches and diameter of twenty (20) inches. The floats were formed using generally cylindrical polyethylene drums wherein the openings 24 and 25 were initially cut in the ends of the drums with such openings being equal to or slightly greater than the diameter of the conduit. Thereafter, the drums were mounted over the reinforced sections of the conduit. With each float shell in place, a foam material was subsequently introduced within the annular cavity between the shells and conduit and allowed to expand to completely fill the cavity.

It should be noted that the diameters of the conduits may vary, for example, between four to twelve or more inches with the lengths of the floats generally being spaced not more than approximately thirty (30) inches from one another.

I claim:

1. A floatable hose comprising a generally cylindrical material conveying conduit having a generally pliable side wall, said conduit including a series of alternating spaced flexible and rigid sections, generally annular reinforcing means positioned at each of said rigid sections, each of said rigid sections being formed by a plurality of float means mounted in spaced relationship with respect to one another along said conduit, said spaced relationship being sufficient to permit the hose to be deployed in relatively compact arcuate configurations while simultaneously insuring said flexible sections of said conduit are open to permit material to flow therethrough, each of said float means being in fixed relationship to said conduit in surrouding and generally coextensive relationship with said reinforcing means, each of said float means having first and second ends and a generally cylindrical passageway therethrough between said first and second ends, said passageways having a diameter substantially equal to the diameter of said conduit whereby said conduit is reinforced and rigidly supported at said spaced sections and is relatively flexible therebetween.

2. The floatable hose of claim 1 in which said reinforcing means is embedded within said side wall of said conduit.

3. The floatable hose of claim 2 in which each of said float means has a length slightly greater than each of said reinforcing means, each of said float means being engaged with said conduit so that said first and second ends thereof extend outwardly beyond each of said reinforcing means along the length of said conduit.

4. The floatable hose of claim 3 in which said float means are generally equally spaced relative to one another along the length of said conduit.

5. The floatable hose of claim 4 in which the length of each of said flexible sections of said conduit between each of said float means is substantially equal to the length of one of said float means.

6. The floatable hose of claim 4 in which each of said float means include an outer substantially cylindrical housing which is generally impervious to fluids and which defines an inner annular chamber, and plastic foam material substantially filling said inner annular chamber.

7. The floatable hose of claim 6 in which each of said plurality of reinforcing means includes a coil of metal wire.

8. A floatable hose comprising a generally cylindrical material conveying conduit having a generally pliable side wall, said conduit including a series of alternating spaced flexible and rigid sections, coiled reinforcing means embedded at each of said rigid sections and within said side wall of said conduit, each of said reinforcing means having a first length relative to said conduit, a plurality of float means fixedly engaged in spaced relationship to said conduit so as to be in surrounding overlying relationship with said reinforcing means, said spaced relationship being sufficient to permit the hose to be deployed in relatively compact arcuate configurations while simultaneously insuring said flexible sections of said conduit are open to permit material to flow therethrough, each of said float means having an outer generally cylindrical surface and spaced ends, said conduit extending generally axially through said spaced ends of each of said float means, said outer generally cylindrical surface of each of said float means defining a diameter greater than the diameter of said conduit so as to define a chamber therebetween, light weight floatable substances filling said chamber of said float means, whereby said reinforcing means prevents the collapse and strengthens said conduit contiguous to each of said float means while the conduit remains relatively flexible between said float means.

9. The floatable hose of claim 8 in which said reinforcing means are generally equally spaced along the length of said conduit.

10. The floatable hose of claim 9 in which each of said float means has a second length between said spaced ends thereof relative to said conduit, said second length being slightly greater than said first length of said reinforcing means, and each of said spaced ends of said float means extending outwardly beyond the underlying one of said reinforcing means so that a portion of said conduit surrounded by each of said float means is not reinforced.

11. The floatable hose of claim 10 in which the spacing between each of said float means is substantially equal to the second length of said float means.

12. The floatable hose of claim 10 in which said second length of said float means is generally not more than 25 percent greater than said first length of said reinforcing means.

13. A floatable hose comprising a generally cylindrical material conveying conduit having a generally pliable side wall, said conduit including a series of alternating spaced flexible and rigid sections, a plurality of generally reinforcing means positioned at spaced internals along said conduit, each of said reinfocing means having a first length relative to said conduit and being embedded within said side wall of said conduit, a plurality of float means mounted in generally fixed and spaced relationship to said conduit and in surrounding and generally coextensive relationship with said reinforcing means, said spaced relationship being sufficient to permit the hose to be deployed in relatively compact arcuate configurations while simultaneously insuring said flexible sections of said conduit are open to permit material to flow therethrough, each of said float means having first and second ends and having an outer substantially cylindrical housing which is generally impervious to fluids and which defines an inner annular chamber, and plastic foam material substantially filling said inner annular chamber so as to be in intimate contact with said side wall of said conduit and said housing whereby said conduit is reinforced and supported at spaced intervals and is relatively flexible therebetween.

14. The floatable hose of claim 13 in which each of said float means has a length greater than said first length of said reinforcing means, said float means being secured to said conduit so that said first and second ends extend outwardly beyond said reinforcing means along the length of said conduit.

15. The floatable hose of claim 14 in which said float means are generally equally spaced relative to one another along the length of said conduit.

16. The floatable hose of claim 15 in which said plurality of reinforcing means include coils of metal wire.

* * * * *